(12) United States Patent
Chang et al.

(10) Patent No.: US 10,935,240 B2
(45) Date of Patent: Mar. 2, 2021

(54) ADDITIVE MANUFACTURED COMBUSTOR HEAT SHIELD

(71) Applicant: UNITED TECHNOLOGIES CORPORATION, Hartford, CT (US)

(72) Inventors: Hoyt Y Chang, Manchester, CT (US); Brooks E Snyder, Glastonbury, CT (US); Thomas N Slavens, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1272 days.

(21) Appl. No.: 14/694,086

(22) Filed: Apr. 23, 2015

(65) Prior Publication Data
US 2016/0313004 A1 Oct. 27, 2016

(51) Int. Cl.
| F23R 3/00 | (2006.01) |
| F23R 3/60 | (2006.01) |
| F23R 3/06 | (2006.01) |
| B33Y 10/00 | (2015.01) |
| B33Y 80/00 | (2015.01) |

(52) U.S. Cl.
CPC .............. *F23R 3/002* (2013.01); *F23R 3/007* (2013.01); *F23R 3/06* (2013.01); *F23R 3/60* (2013.01); *B33Y 10/00* (2014.12); *B33Y 80/00* (2014.12); *F23R 2900/03042* (2013.01); *Y02T 50/675* (2013.01)

(58) Field of Classification Search
CPC .. F23R 3/002; F23R 3/007; F23R 3/04; F23R 3/06; F23R 3/60; F23R 2900/03041; F23R 2900/03042; F23R 2900/03043; F23R 2900/03044; F23R 2900/03045; F05D 2240/15; F05D 2260/201; F05D 2260/202; F05D 2260/30; F05D 2260/31
See application file for complete search history.

(56) References Cited

U.S. PATENT DOCUMENTS

| 4,191,011 A | 3/1980 | Sweeney et al. |
| 4,195,476 A | 4/1980 | Wood |
| 4,422,300 A * | 12/1983 | Dierberger .............. F23R 3/007 60/753 |
| 5,144,793 A * | 9/1992 | Able ...................... F23R 3/045 60/757 |
| 5,323,601 A | 6/1994 | Jarrell et al. |
| 5,609,031 A | 3/1997 | Jones |
| 5,758,503 A | 6/1998 | DuBell et al. |
| 5,799,491 A | 9/1998 | Bell et al. |
| 6,141,862 A | 11/2000 | Matsui et al. |

(Continued)

FOREIGN PATENT DOCUMENTS

| WO | 2014/200588 A2 | 12/2014 |
| WO | 2015/047472 A2 | 4/2015 |

OTHER PUBLICATIONS

European Search Report for EP 16166599.7 dated Sep. 12, 2016.

*Primary Examiner* — Scott J Walthour
(74) *Attorney, Agent, or Firm* — Bachman & LaPointe, P.C.

(57) ABSTRACT

A heat shield for use in a combustor of a gas turbine engine including a plurality of standoff pins that extend from a cold side, the plurality of standoff pins at least partially surround an attachment stud, the cold side including at least one film cooling hole adjacent to the plurality of standoff pins and the attachment stud.

15 Claims, 8 Drawing Sheets

(56) References Cited

U.S. PATENT DOCUMENTS

| | | | |
|---|---|---|---|
| 6,718,774 B2* | 4/2004 | Razzell | F01D 25/243 |
| | | | 60/753 |
| 7,013,647 B2 | 3/2006 | Nishimura et al. | |
| 7,024,863 B2 | 4/2006 | Morenko | |
| 7,146,815 B2 | 12/2006 | Burd | |
| 7,631,503 B2 | 12/2009 | Stastny et al. | |
| 7,827,800 B2 | 11/2010 | Stastny et al. | |
| 8,205,336 B2 | 6/2012 | Stastny et al. | |
| 8,495,881 B2 | 7/2013 | Edwards et al. | |
| 8,800,298 B2 | 8/2014 | Ladd et al. | |
| 8,833,084 B2 | 9/2014 | Carlisle | |
| 8,910,378 B2 | 12/2014 | Kinstler | |
| 8,984,896 B2 | 3/2015 | Davenport et al. | |
| 2003/0213250 A1 | 11/2003 | Pacheco-Tougas et al. | |
| 2004/0093872 A1* | 5/2004 | Tiemann | F16B 33/00 |
| | | | 60/796 |
| 2005/0022531 A1* | 2/2005 | Burd | F23R 3/002 |
| | | | 60/752 |
| 2010/0095679 A1* | 4/2010 | Rudrapatna | F23R 3/005 |
| | | | 60/752 |
| 2011/0011095 A1* | 1/2011 | Ladd | F23R 3/002 |
| | | | 60/796 |
| 2011/0048024 A1* | 3/2011 | Snyder | F23R 3/06 |
| | | | 60/754 |
| 2011/0126543 A1* | 6/2011 | Kirsopp | F23R 3/002 |
| | | | 60/742 |
| 2014/0093370 A1* | 4/2014 | Mattia | F02C 7/00 |
| | | | 415/214.1 |
| 2014/0190166 A1* | 7/2014 | Pidcock | F23R 3/002 |
| | | | 60/722 |
| 2014/0216042 A1 | 8/2014 | Hanson | |

\* cited by examiner

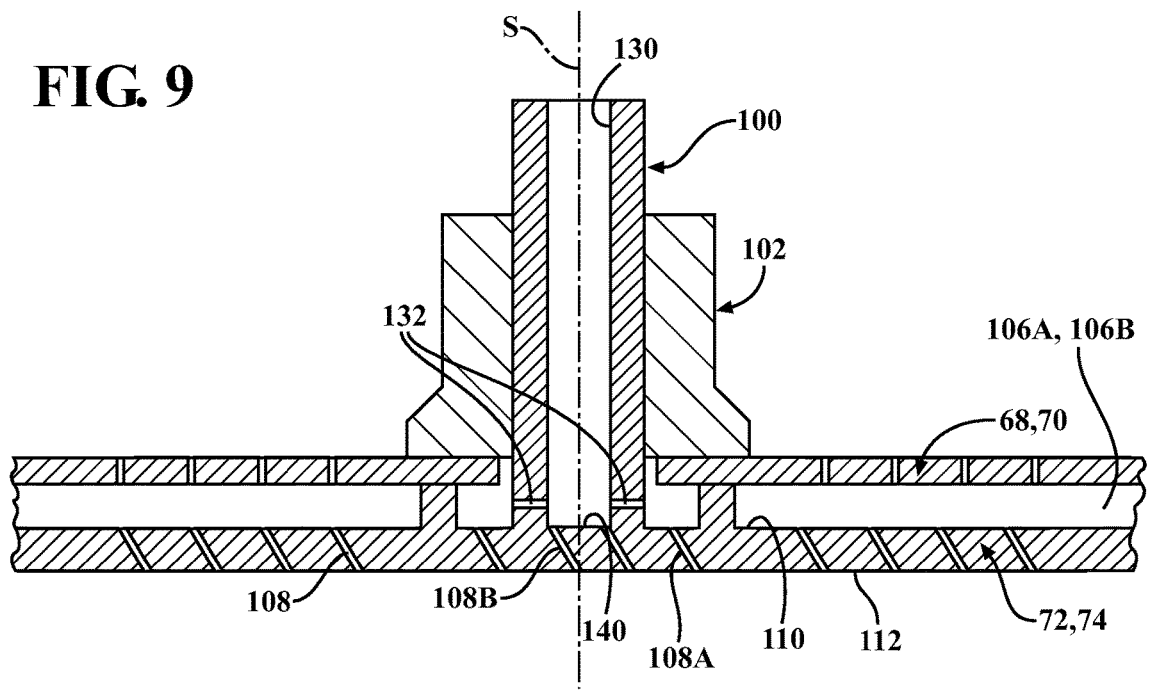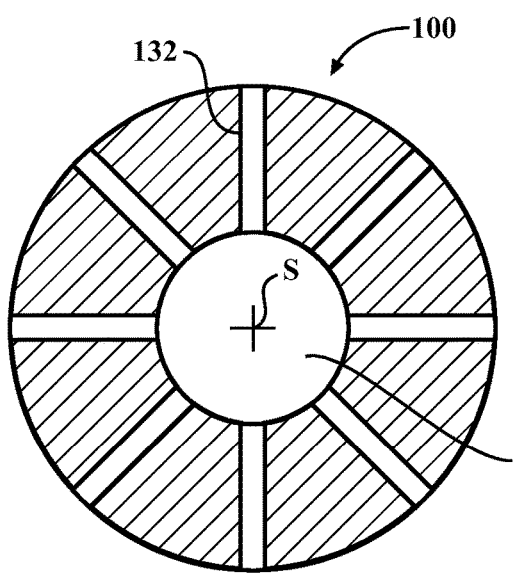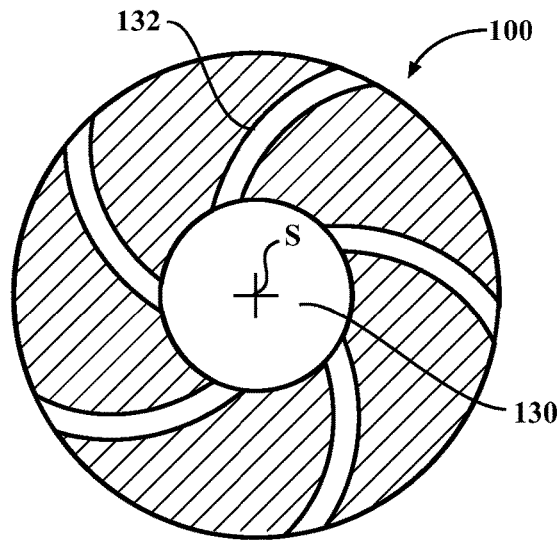

ADDITIVE MANUFACTURED COMBUSTOR HEAT SHIELD

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases.

Combustors are subject to high thermal loads for prolonged time periods. Historically, combustors have implemented various cooling arrangements to cool the combustor liner assemblies. Among these is a double liner assembly that locates heat shields directly adjacent to the combustion gases. The heat shields are cooled via impingement on the backside and film cooling on the combustion gas side to maintain temperatures within material limits.

The film cooling is typically effectuated with numerous laser-drilled film cooling holes through the heat shields. Although effective, the film cooling holes cannot be located near mechanical support structure such as the attachment studs and surrounding standoff pins as the laser drilling can back strike the mechanical support structure. Such a back strike may weaken the mechanical support structure.

Typically, a localized hot spot occurs adjacent to the mechanical support structure due the lack of film cooling holes. Such a hot spot may eventually result in oxidation and reduced durability proximate the mechanical support structure

SUMMARY

A heat shield for use in a combustor of a gas turbine engine according to one disclosed non-limiting embodiment of the present disclosure can include a plurality of standoff pins that extend from a cold side, the plurality of standoff pins at least partially surround an attachment stud, the cold side including at least one film cooling hole adjacent to the plurality of standoff pins and the attachment stud.

A further embodiment of any of the embodiments of the present disclosure may include, wherein the plurality of standoff pins is arranged in a ring pattern.

A further embodiment of any of the embodiments of the present disclosure may include, wherein the at least one film cooling hole is located within a diameter defined by the ring pattern.

A further embodiment of any of the embodiments of the present disclosure may include, wherein the at least one film cooling hole is located between the plurality of standoff pins and the attachment stud.

A further embodiment of any of the embodiments of the present disclosure may include, wherein the at least one film cooling hole is located between two of the plurality of standoff pins.

A further embodiment of any of the embodiments of the present disclosure may include, wherein the at least one film cooling hole is located between two of the plurality of standoff pins, the at least one film cooling hole located along a ring pattern defined by the plurality of standoff pins.

A further embodiment of any of the embodiments of the present disclosure may include, wherein the heat shield is additively manufactured.

A combustor for a gas turbine engine according to one disclosed non-limiting embodiment of the present disclosure can include a support shell having a plurality of impingement cooling holes and a heat shield having an attachment stud that extends from a cold side of the heat shield through a stud aperture in the support shell, the heat shield having a plurality of standoff pins that extend from the cold side to abut the support shell and at least partially surround the attachment stud, the cold side including at least one film cooling hole adjacent to the plurality of standoff pins and the attachment stud.

A further embodiment of any of the embodiments of the present disclosure may include a nut received onto the attachment strut to retain the heat shield to the support shell.

A further embodiment of any of the embodiments of the present disclosure may include a nut received onto the attachment strut to retain the heat shield to the support shell.

A further embodiment of any of the embodiments of the present disclosure may include, wherein the plurality of standoff pins is arranged in a ring pattern.

A further embodiment of any of the embodiments of the present disclosure may include, wherein the ring pattern defines a diameter less than a diameter of the nut.

A further embodiment of any of the embodiments of the present disclosure may include, wherein the at least one film cooling hole is located within a diameter defined by the ring pattern.

A further embodiment of any of the embodiments of the present disclosure may include, wherein the at least one film cooling hole is located between the plurality of standoff pins and the attachment stud.

A further embodiment of any of the embodiments of the present disclosure may include, wherein the at least one film cooling hole is located between two of the plurality of standoff pins.

A further embodiment of any of the embodiments of the present disclosure may include, wherein the at least one film cooling hole is located between two of the plurality of standoff pins, the at least one film cooling hole located along the ring pattern defined by the plurality of standoff pins.

A further embodiment of any of the embodiments of the present disclosure may include, wherein the heat shield is additively manufactured.

A method of manufacturing a heat shield of a combustor for a gas turbine engine according to one disclosed non-limiting embodiment of the present disclosure can include additively manufacturing an attachment stud and a plurality of standoff pins that extend from a cold side of the heat shield; the additively manufacturing a plurality of film cooling holes through the heat shield, at least one of the plurality of film cooling holes adjacent to the plurality of standoff pins and the attachment stud.

A further embodiment of any of the embodiments of the present disclosure may include additively manufacturing the plurality of standoff pins to be arranged in a ring pattern, the at least one of the plurality of film cooling holes located within a diameter defined by the ring pattern.

A further embodiment of any of the embodiments of the present disclosure may include additively manufacturing the plurality of standoff pins in the ring pattern along a diameter less than a diameter of a nut receivable onto the attachment stud.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 9 is an expanded sectional view of the attachment stud of FIG. 8;

FIG. 10 is an expanded lateral sectional view of a hollow attachment stud according to another non-limiting embodiment; and FIG. 11 is an expanded lateral sectional view of a hollow attachment stud according to another non-limiting embodiment.

DETAILED DESCRIPTION

Figure 1:
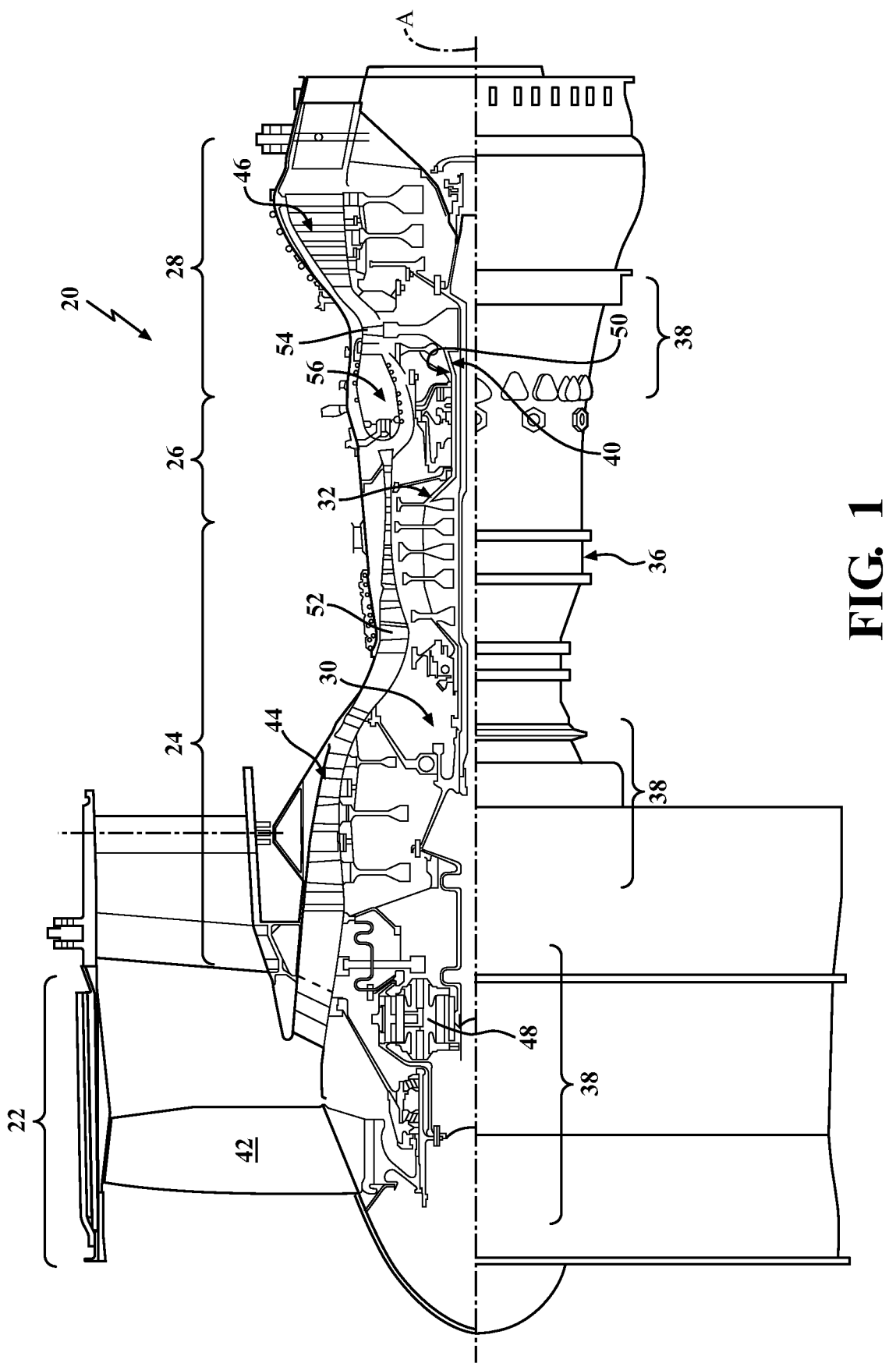
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use only with turbofans as the teachings may be applied to other types of turbine engines such as a turbojets, turboshafts, and three-spool (plus fan) turbofans.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The the HPT 54 and the LPT 46 rotationally drive the respective high spool 32 and low spool 30 in response to the expansion. The main engine shafts 40, 50 are supported at a plurality of points by bearing structures 38 within the static structure 36. It should be appreciated that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
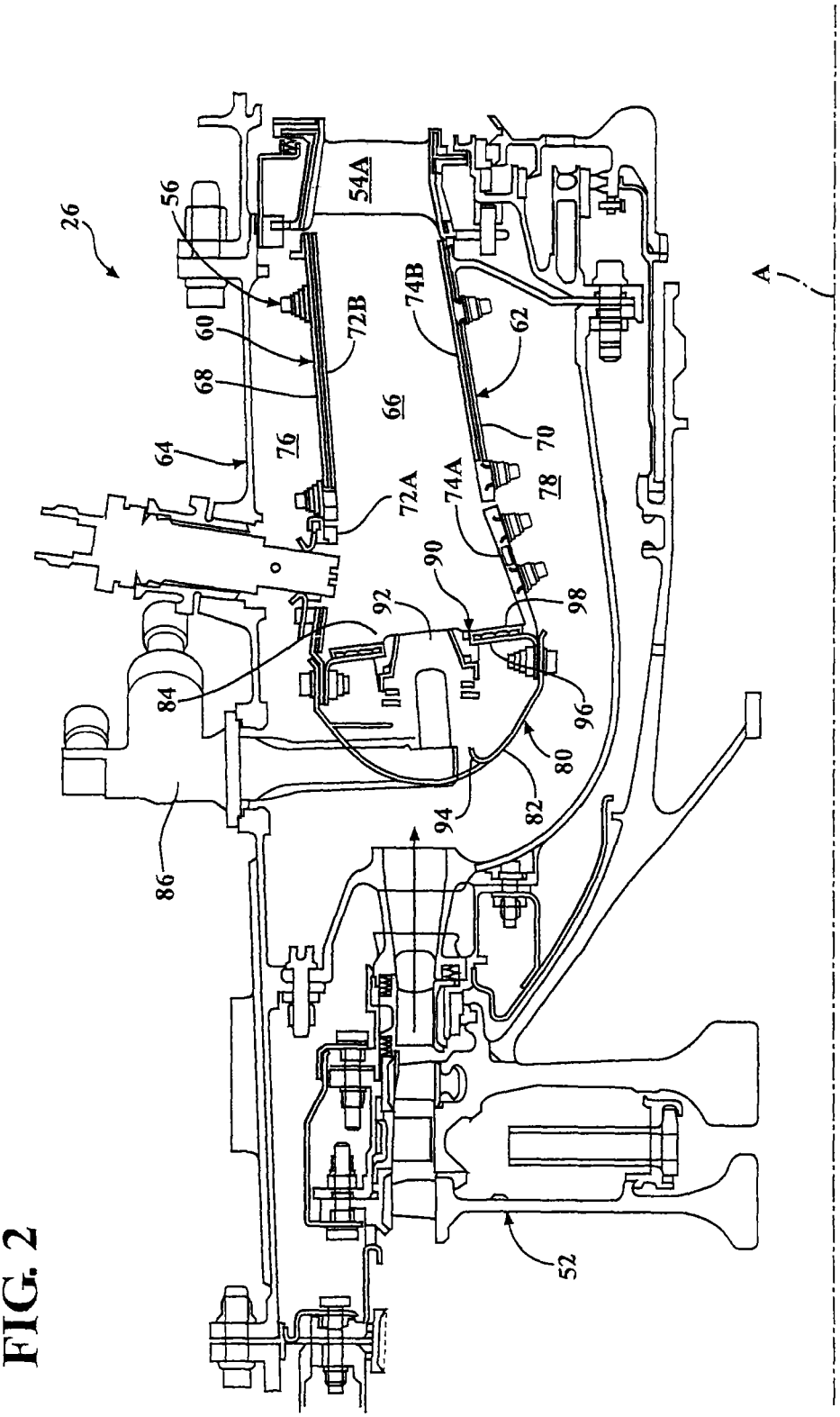
FIG. 2 is an expanded longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case of the diffuser case module 64 to define an outer annular plenum 76. The inner combustor liner assembly 62 is spaced radially outward from an inner diffuser case of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

Figure 3:
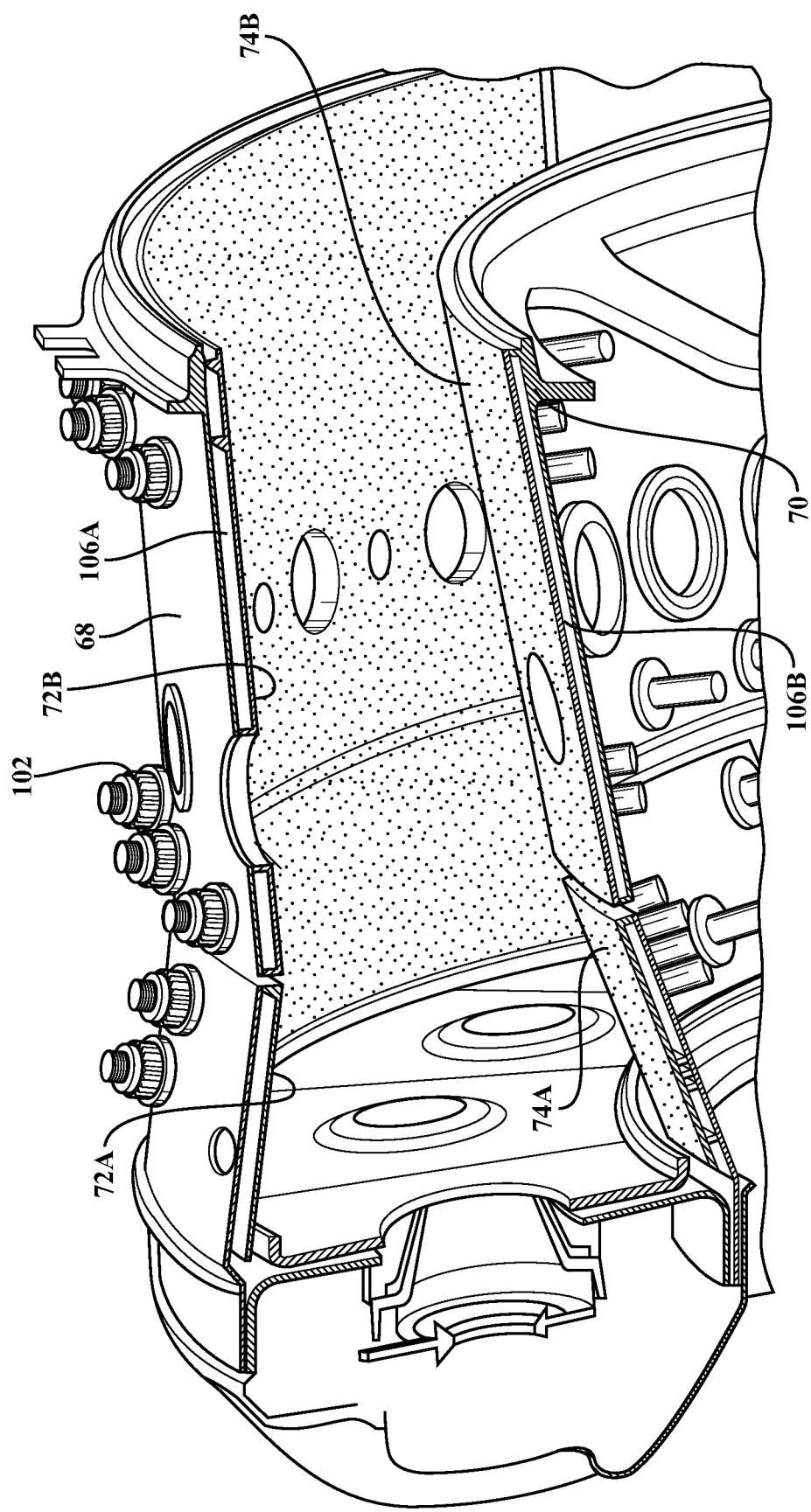
FIG. 3 is an expanded longitudinal schematic partial perspective view of a combustor section according to one non-limiting embodiment that may be used with the gas turbine engine shown in FIG. 1.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a plurality of forward heat shields 72A and a plurality of aft heat shields 72B that are circumferentially staggered to line the hot side of the support shell 68 (also shown in FIG. 3). A plurality of forward heat shields 74A and a plurality of aft heat shields 74B are circumferentially staggered to line the hot side of the inner shell 70 (also shown in FIG. 3).

The combustor 56 further includes a forward assembly 80 immediately downstream of the compressor section 24 to receive compressed airflow therefrom. The forward assembly 80 generally includes an annular hood 82, a bulkhead assembly 84, a plurality of fuel nozzles 86 (one shown) and a plurality of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a plurality of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a plurality of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The plurality of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
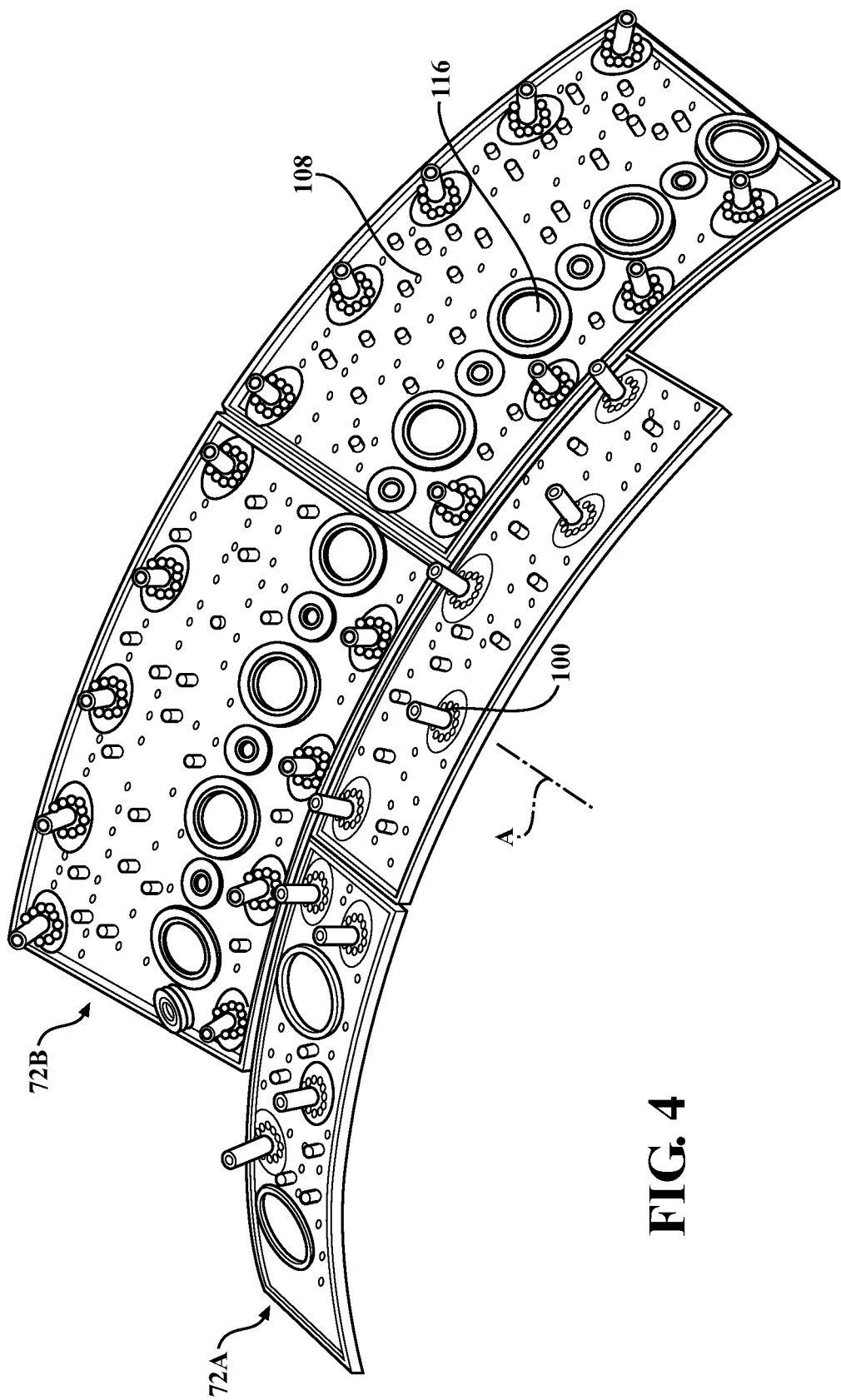
FIG. 4 is an expanded perspective view of a heat shield array from a cold side.
Figure 5:
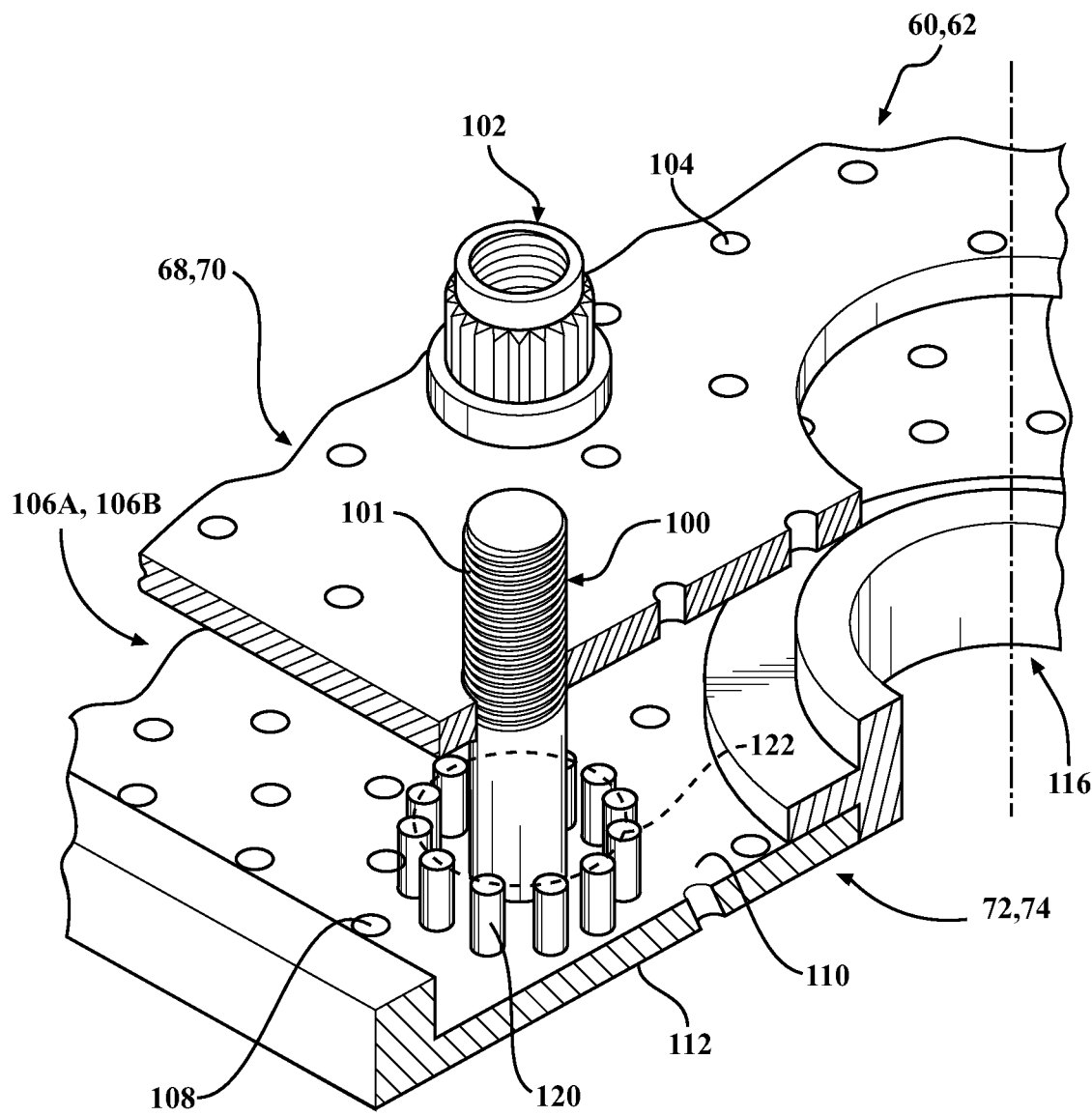
FIG. 5 is an exploded view of a liner assembly illustrating one attachment stud thereof.

With reference to FIG. 4, a plurality of studs 100 extend from the heat shields 72, 74 to mount the heat shields 72, 74 to the respective support shells 68, 70 with a respective nut 102 (shown in FIG. 5). That is, the studs 100 project rigidly from the heat shields 72, 74 and through the respective support shells 68, 70 to receive the nut 102 at a threaded distal end section 101 thereof.

Figure 6:
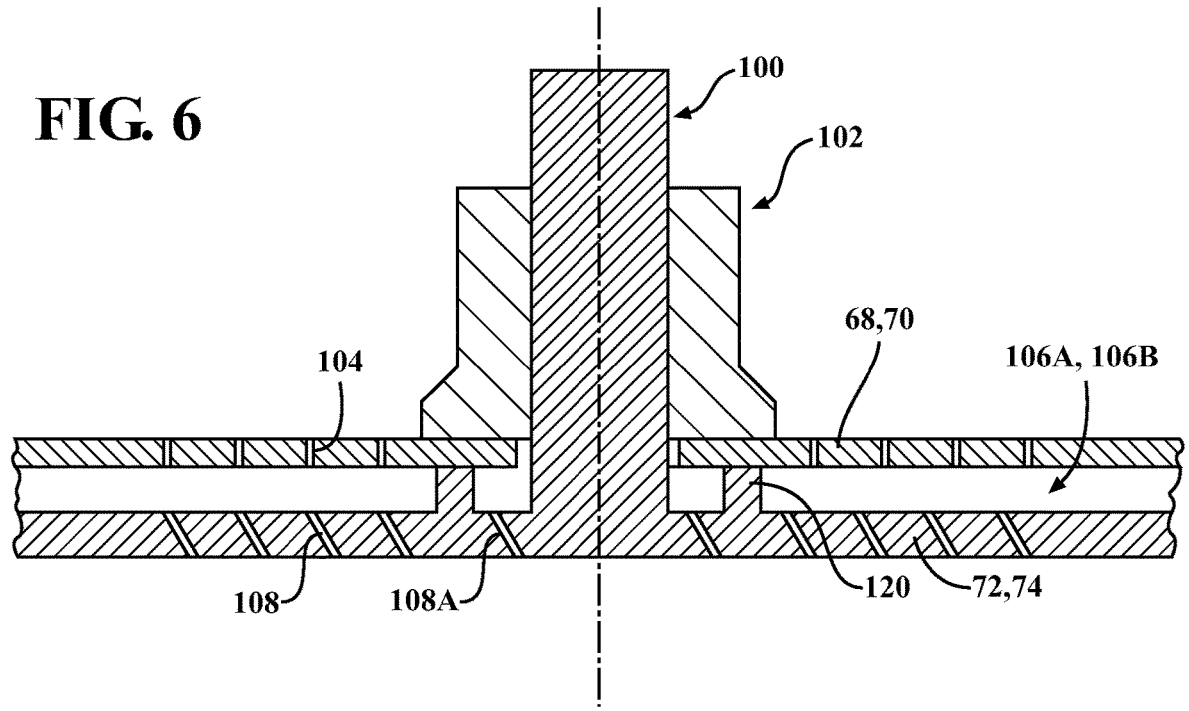
FIG. 6 is an expanded sectional view of the attachment stud of FIG. 5.

With reference to FIG. 5, a plurality of impingement cooling holes 104 penetrate through the support shells 68, 70 to allow air from the respective annular plenums 76, 78 to enter cavities 106A, 106B (also shown in FIG. 6) formed in the combustor liner assemblies 60, 62 between the respective support shells 68, 70 and heat shields 72, 74. The impingement cooling holes 104 are generally normal to the surface of the heat shields 72, 74. The air in the cavities 106A, 106B provides backside impingement cooling of the heat shields 72, 74 that is generally defined herein as heat removal via internal convection.

A plurality of film cooling holes 108 penetrate through each of the heat shields 72, 74. The geometry of the film cooling holes, e.g, diameter, shape, density, surface angle, incidence angle, etc., as well as the location of the holes with respect to the high temperature main flow also contributes to effusion film cooling. The combination of impingement cooling holes 104 and film cooling holes 108 may be referred to as an Impingement Film Floatliner assembly.

The film cooling holes 108 allow the air to pass from the cavities 106A, 106B defined in part by a cold side 110 of the heat shields 72, 74 to a hot side 112 of the heat shields 72, 74 and thereby facilitate the formation of a film of cooling air along the hot side 112. The film cooling holes 108 are generally more numerous than the impingement cooling holes 104 to promote the development of a film cooling along the hot side 112 to sheath the heat shields 72, 74. Film cooling as defined herein is the introduction of a relatively cooler airflow at one or more discrete locations along a surface exposed to a high temperature environment to protect that surface in the immediate region of the airflow injection as well as downstream thereof.

A plurality of dilution holes 116 penetrate through both the respective support shells 68, 70 and heat shields 72, 74. For example only, in a Rich-Quench-Lean (R-Q-L) type combustor, the dilution holes 116 are located downstream of the forward assembly 80 to quench the hot gases by supplying cooling air into the combustor. The hot combustion gases slow towards the dilution holes 116 and may form a stagnation point at the leading edge which becomes a heat source and may challenge the durability of the heat shields 72, 74 proximate this location. At the trailing edge of the dilution hole, due to interaction with dilution jet, hot gases form a standing vortex pair that may also challenge the durability of the heat shields 72, 74 proximate this location.

Each of the plurality of studs 100 that extend from the heat shields 72, 74 are surrounded by a plurality of standoff pins 120. The plurality of standoff pins 120 may be arranged to support the nut 102 when threaded to the stud 100. That is, the standoff pins 120 prevent undesirable deflection of the support shells 68, 70 once the fasteners 102 is threaded onto the stud 100. In one embodiment, the plurality of standoff pins 120 may be arranged in a ring pattern 122 of a diameter about equal to the diameter of the nut 102.

The heat shields 72, 74, their associated attachment studs 100, and film cooling holes 108 may be manufactured via an additive manufacturing process. The additive manufacturing process includes, but are not limited to, Selective Laser Sintering (SLS), Electron Beam Sintering (EBS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), and Laser Powder Bed Fusion (L-PBF).

The additive manufacturing process sequentially builds-up layers of atomized alloy and/or ceramic powder material that include, but is not limited to, 625 Alloy, 718 Alloy, 230 Alloy, stainless steel, tool steel, cobalt chrome, titanium, nickel, aluminum, silicon carbide, silicon nitride, and others in atomized powder material form. Alloys such as 625, 718 and 230 may have specific benefit for components that operate in high temperature environments, such as, for example, environments typically encountered by aerospace and gas turbine engine components. Although particular additive manufacturing processes are disclosed, it should be appreciated that any other suitable rapid manufacturing methods using layer-by-layer construction or additive fabrication can alternatively be used.

The additive manufacturing process facilitates manufacture of the numerous and relatively complex arrangement of film cooling holes 108 in the heat shields 72, 74. The additive manufacturing process fabricates, or "grows," components using three-dimensional information, for example a three-dimensional computer model. The three-dimensional information is converted into a plurality of slices, each slice defining a cross section of the component for a predetermined height of the slice. The additive manufactured component is then "grown" slice by slice, or layer by layer, until finished. Each layer may have an example size between about 0.0005-0.001 inches (0.0127-0.0254 mm). Although particular additive manufacturing processes are disclosed, it should be appreciated that any other suitable rapid manufacturing methods using layer-by-layer construction or additive fabrication can alternatively be used.

Figure 7:
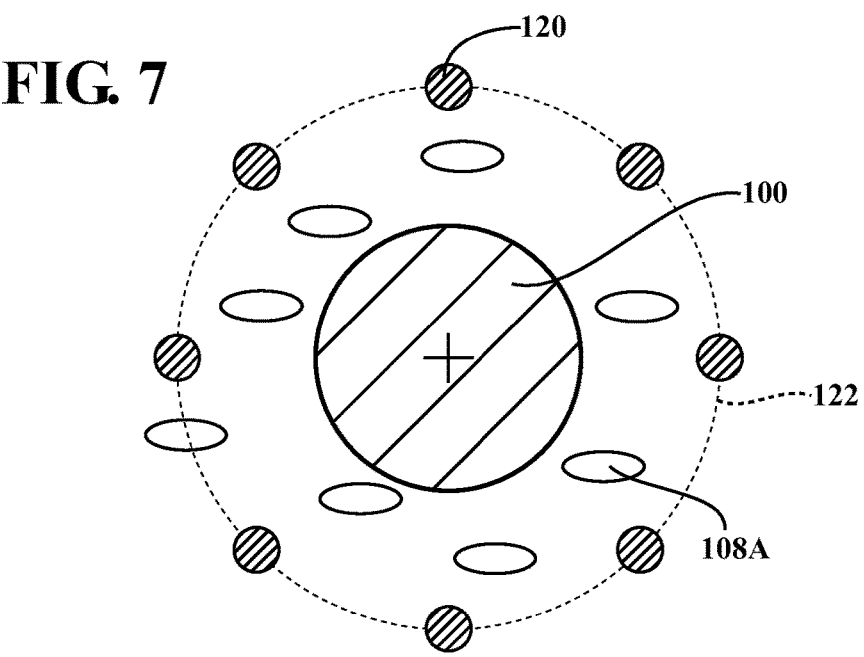
FIG. 7 is a top view of a heat shield with film cooling holes according to one non-limiting embodiment.

Additive manufacturing the heat shields 72, 74 and the relatively complex arrangement of film cooling holes 108 permits the extension of the cooling scheme to be adjacent the attachment stud 100 and the standoff pins 120 in a manner otherwise unobtainable with laser drilling. In one example, the film cooling holes 108A are located within the ring pattern 122 of standoff pins 120 (FIG. 7). It should be appreciated that the ring pattern 122 is merely representative of an arrangement of standoff pins 120, and other arrangements will also benefit herefrom The film cooling holes 108A may alternatively, or additionally, be located near the standoff pins 120, between the standoff pins 120, and/or between the standoff pins 120 and the attachment stud 100. In one example, the film cooling holes 108A adjacent to the attachment stud 100 can be aligned with the surrounding film cooling holes 108 to provide a uniform film that is contiguous. It should be appreciated that these film cooling holes 108A can be additive manufactured at various angles, patterns, sizes, or shapes to counter local flow conditions adjacent to each attachment stud 100.

Figure 8:
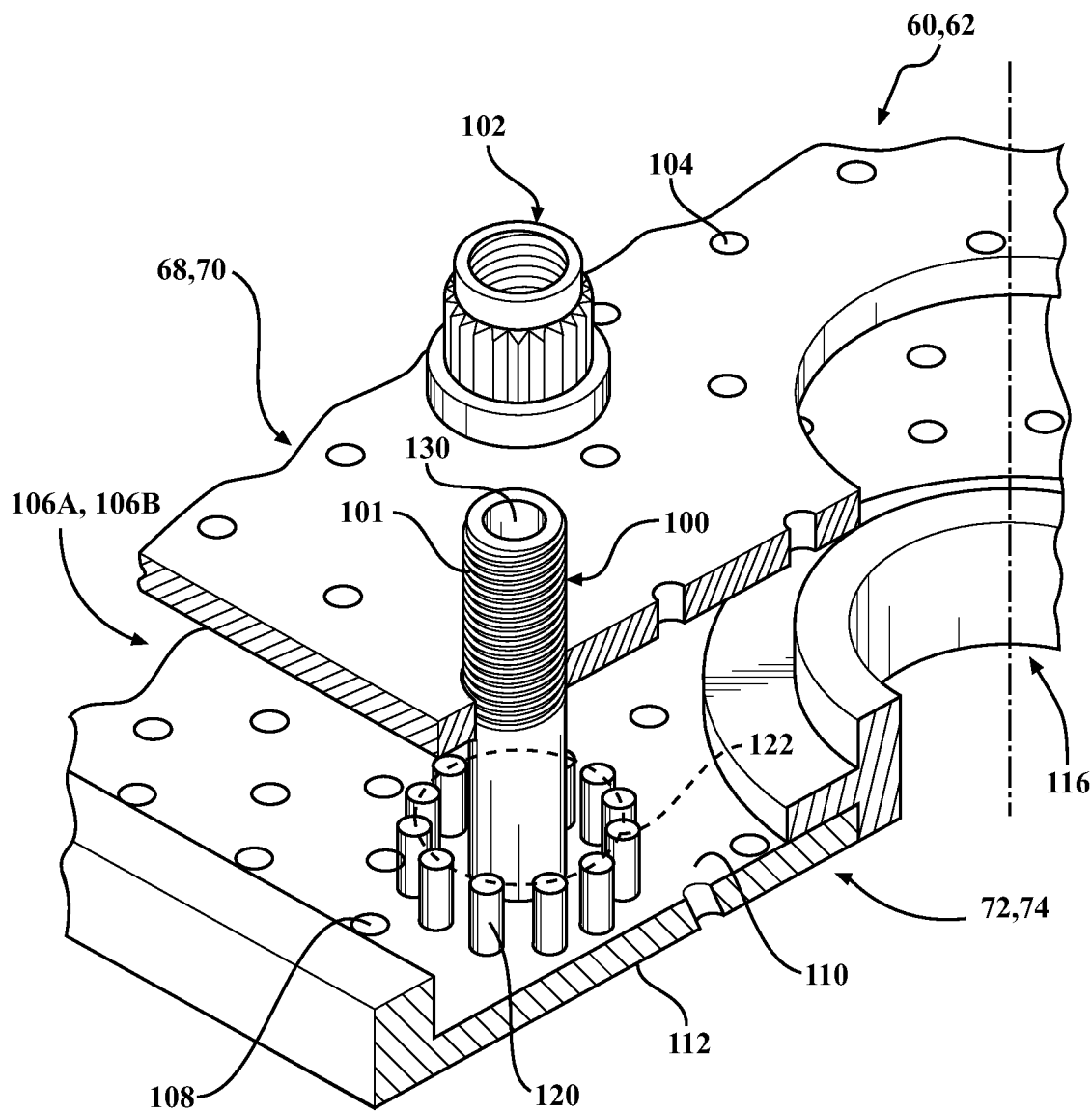
FIG. 8 is an exploded view of a liner assembly illustrating one hollow attachment stud according to another non-limiting embodiment.

Additive manufacturing of the heat shields 72, 74 readily permits the addition of film cooling holes 108A proximate the attachment stud 100, readily distributes uniform film cooling air adjacent to this mechanical support structure which has heretofore been a hot spot area. Additive manufacturing also permits the placement of the film cooling holes 108A without risk of back strikes into the mechanical support structure With reference to FIG. 8, in another disclosed non-limiting embodiment, the additive manufacturing of the heat shields 72, 74 readily permits the attachment stud 100 to be manufactured with an at least partially hollow stud section. The at least partially hollow attachment stud 100 defines a cooling air passage 130 along an axis S of the attachment stud 100 (FIG. 9).

With reference to FIG. 9, the cooling air passage 130 may terminate at the cold side 110 of the heat shields 72, 74 with the plurality of stud cooling holes 132 that extend transverse to the axis S to communicate cooling air into the respective cavities 106A, 106B and thereby compensate for a lack of impingement cooling at that location. That is, the stud cooling passages are axially located between the respective heat shield 72, 74 and the support shell 68, 70.

The plurality of stud cooling holes 132 may be located adjacent to a stud end 140 of the attachment stud 100. That is, the stud end 140 essentially forms a bottom of the attachment stud 100 and may be essentially flush with the cold side 110 of the heat shields 72, 74. The plurality of cooling holes 132 may be of various angles, patterns, sizes, or shapes to counter local flow conditions adjacent to each attachment stud 100 that is simply unobtainable with laser drilling. In one example, the plurality of stud cooling holes 132 are arranged in a radial spoke pattern (FIG. 10). In another example, the plurality of stud cooling holes 132 is arranged in a spiral pattern (FIG. 11). It should be appreciated that each of the plurality of stud cooling holes 132 may be of individually different angles, patterns, sizes, and/or shapes. The radial or spiral cooling holes near the hot end of the cavity facilitate the provision of backside cooling.

In another embodiment, a plurality of film cooling holes 108B may be located through the stud end 140 of the attachment stud 100. The film cooling holes 108B can be arranged to align film cooling from the a stud end 140 with the surrounding film cooling holes 108 to produce a uniform film cooling that removes the heretofore dearth of film cooling adjacent to the attachment location caused by the mechanical support structure. It should be appreciated that the film cooling holes 108B can have different angles, sizes, or shapes, in comparison to the film cooling holes 108 to control the volume and direction of film cooling.

Additive manufacturing permits the entirety of the heat shields 72, 74, including the attachment locations, to receive uniform film cooling air. If a hot spot occurs at an attachment location, cooling air directed thereto can improve the life of the panel, and thus reduce maintenance and replacement costs. Also, as laser drilling is avoided, the potential risk of liberated slivers damaging downstream hardware is completely avoided.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of manufacturing a heat shield of a combustor for a gas turbine engine, the heat shield comprising a hollow attachment stud connected to a cold side of the heat shield by a stud end of the hollow attachment stud and configured to receive a nut at a free end of the hollow attachment stud, the heat shield further comprising a plurality of standoff pins that extend from the cold side, said plurality of standoff pins surrounding the hollow attachment stud, said plurality of standoff pins forming a ring pattern around said hollow attachment stud, said ring pattern of said plurality of standoff pins defining a diameter less than a diameter of said nut, wherein the hollow attachment stud comprises a cooling air passage along a central axis of said hollow attachment stud, at least one film cooling hole penetrating through the stud end of the hollow attachment stud and configured to discharge air from the cooling air passage to a hot side of the heat shield, and the hollow attachment stud further comprising a plurality of stud cooling holes that extends through said hollow attachment stud transverse to the central axis of said hollow attachment stud, said plurality of stud cooling holes arranged along a length of said hollow attachment stud between said cold side of said heat shield and said free end of the hollow attachment stud, the method comprising:

additively manufacturing the heat shield to form the heat shield with each of the hollow attachment stud and the plurality of standoff pins extending from the cold side and with a plurality of additional film cooling holes through said heat shield, at least one of said plurality of additional film cooling holes being adjacent to said plurality of standoff pins and said hollow attachment stud.

2. The method as recited in claim 1, wherein additively manufacturing the heat shield further comprises additively manufacturing said plurality of standoff pins to be arranged in the ring pattern, said at least one of said plurality of additional film cooling holes being located within the diameter defined by said ring pattern.

3. A heat shield for use in a combustor of a gas turbine engine, the heat shield comprising:
   a hollow attachment stud connected to a cold side of the heat shield by a stud end of the hollow attachment stud and configured to receive a nut at a free end of the hollow attachment stud; and
   a plurality of standoff pins that extend from the cold side, said plurality of standoff pins surrounding the hollow attachment stud, said plurality of standoff pins forming a ring pattern around said hollow attachment stud, said ring pattern of said plurality of standoff pins defining a diameter less than a diameter of said nut,
   wherein the hollow attachment stud comprises:
      a cooling air passage along a central axis of said hollow attachment stud;
      at least one film cooling hole penetrating through the stud end of the hollow attachment stud and configured to discharge air from the cooling air passage to a hot side of the heat shield; and
      a plurality of stud cooling holes that extends through said hollow attachment stud transverse to the central axis of said hollow attachment stud, said plurality of stud cooling holes arranged along a length of said hollow attachment stud between said cold side of said heat shield and said free end of the hollow attachment stud.

4. The heat shield as recited in claim 3, wherein said heat shield is additively manufactured.

5. The heat shield as recited in claim 3, wherein said plurality of stud cooling holes is arranged in a radial spoke pattern.

6. The heat shield as recited in claim 3, wherein said plurality of stud cooling holes is arranged in a spiral pattern.

7. The heat shield as recited in claim 3, further comprising a surrounding multiple of film cooling holes through the heat shield at an angle, the at least one film cooling hole penetrating through the stud end of the hollow attachment stud arranged at the angle to align with the surrounding multiple of film cooling holes.

8. A combustor for a gas turbine engine, the combustor comprising:
   a support shell having a plurality of impingement cooling holes; and
   a heat shield comprising:
      a hollow attachment stud connected to a cold side of the heat shield by a stud end of the hollow attachment stud;
      a plurality of standoff pins extending from said cold side to abut said support shell and at least partially surrounding said hollow attachment stud, said plurality of standoff pins forming a ring pattern around said hollow attachment stud,
      wherein the hollow attachment stud comprises:
         a cooling air passage along a central axis of said hollow attachment stud, the hollow attachment stud extending from the cold side of said heat shield through a stud aperture in said support shell;
         at least one film cooling hole penetrating through the stud end of the hollow attachment stud and configured to discharge air from the cooling air passage to a hot side of the heat shield; and
         a plurality of stud cooling holes arranged transverse to, and in fluid communication with, the cooling air passage, the plurality of stud cooling holes arranged along a length of said hollow attachment stud between said cold side of said heat shield and said support shell.

9. The combustor as recited in claim 8, further comprising a nut received onto said hollow attachment stud to retain said heat shield to said support shell.

10. The combustor as recited in claim 9, wherein said diameter defined by said ring pattern is less than a diameter of said nut.

11. The combustor as recited in claim 9, wherein said heat shield is additively manufactured.

12. A combustor for a gas turbine engine, the combustor comprising:
   a support shell having a plurality of impingement cooling holes; and
   a heat shield comprising:
      a hollow attachment stud connected to a cold side of the heat shield by a stud end of the hollow attachment stud;
      a plurality of standoff pins extending from said cold side to abut said support shell and surrounding said hollow attachment stud, said plurality of standoff pins forming a ring pattern around said attachment stud;
      wherein the hollow attachment stud comprises:
         a cooling air passage along a central axis of said hollow attachment stud, said hollow attachment stud extending from the cold side of said heat shield through a stud aperture in said support shell;
         at least one film cooling hole penetrating through the stud end of the hollow attachment stud and configured to discharge air from the cooling air passage to a hot side of the heat shield; and
         a plurality of stud cooling holes extending through said hollow attachment stud transverse to the central axis of said hollow attachment stud, said plurality of stud cooling holes arranged along a length of said hollow attachment stud between said cold side of said heat shield and said support shell;
      wherein the heat shield further comprises at least one additional film cooling hole penetrating through said cold side within a diameter defined by said ring pattern.

13. The combustor as recited in claim 12, wherein said plurality of stud cooling holes is arranged in a radial spoke pattern.

14. The combustor as recited in claim 12, wherein said plurality of stud cooling holes is arranged in a spiral pattern.

15. The combustor as recited in claim 12, wherein said plurality of stud cooling holes extends through said hollow attachment stud perpendicular to the central axis of said hollow attachment stud.

* * * * *